(12) United States Patent
Ferrington et al.

(10) Patent No.: US 11,210,630 B2
(45) Date of Patent: Dec. 28, 2021

(54) INTEGRATED RECEIVING AND CLASSIFICATION OF COMPUTER HARDWARE

(71) Applicant: ServiceNow, Inc., Santa Clara, CA (US)

(72) Inventors: Eric Charles Ferrington, Washington, MI (US); Preetam Mallappa, San Jose, CA (US)

(73) Assignee: ServiceNow, Inc., Santa Clara, CA (US)

( * ) Notice: Subject to any disclaimer, the term of this patent is extended or adjusted under 35 U.S.C. 154(b) by 297 days.

(21) Appl. No.: 16/401,958

(22) Filed: May 2, 2019

(65) Prior Publication Data

US 2020/0349507 A1 Nov. 5, 2020

(51) Int. Cl.
*G06Q 10/08* (2012.01)
*G06K 9/00* (2006.01)
*G06K 9/32* (2006.01)
*G06K 19/06* (2006.01)
*G06F 16/23* (2019.01)
G06F 3/0482 (2013.01)
G06F 3/0484 (2013.01)

(52) U.S. Cl.
CPC ..... *G06Q 10/0875* (2013.01); *G06F 16/2379* (2019.01); *G06K 9/00671* (2013.01); *G06K 9/3258* (2013.01); *G06F 3/0482* (2013.01); *G06F 3/0484* (2013.01); *G06K 19/06028* (2013.01); *G06K 19/06037* (2013.01); *G06K 2209/01* (2013.01)

(58) Field of Classification Search
CPC .. G06Q 10/087; G06Q 10/0875; G06K 19/00; G06K 19/04; G06K 19/06
USPC .............. 705/29, 28, 1.1; 235/385, 375, 487
See application file for complete search history.

(56) References Cited

U.S. PATENT DOCUMENTS

| | | |
|---|---|---|
| 5,978,594 A | 11/1999 | Bonnell |
| 6,321,229 B1 | 11/2001 | Goldman |
| 6,678,887 B1 | 1/2004 | Hallman |
| 6,799,189 B2 | 9/2004 | Huxoll |
| 6,816,898 B1 | 11/2004 | Scarpelli |
| 6,895,586 B1 | 5/2005 | Brasher |
| 7,027,411 B1 | 4/2006 | Pulsipher |
| 7,392,300 B2 | 6/2008 | Anantharangachar |
| 7,617,073 B2 | 11/2009 | Trinon |
| 7,685,167 B2 | 3/2010 | Mueller |

(Continued)

*Primary Examiner* — Edwyn Labaze
(74) *Attorney, Agent, or Firm* — Fletcher Yoder PC

(57) ABSTRACT

A mobile computing device may include a screen, a camera, a communication interface, a processor, and memory. A native mobile application executing thereon may be configured to: obtain, by way of the communication interface, a plurality of orders; display, on the screen, a first graphical user interface depicting one or more of the plurality of orders; receive, by way of the screen, a selection of a particular order from the one or more of the plurality of orders; display, on the screen, a second graphical user interface depicting the particular order and that the line item has been ordered but not received; capture, by way of the camera, an image of a physical package; determine that a machine-readable representation from the image is associated with the line item; and transmit, by way of the communication interface, an update indicating that the line item has been received.

16 Claims, 20 Drawing Sheets

(56) References Cited

U.S. PATENT DOCUMENTS

| | | | |
|---|---|---|---|
| 7,877,783 B1 | 1/2011 | Cline | |
| 7,933,927 B2 | 4/2011 | Dee | |
| 7,945,860 B2 | 5/2011 | Vambenepe | |
| 8,082,222 B2 | 12/2011 | Rangarajan | |
| 8,380,645 B2 | 2/2013 | Kowalski | |
| 8,554,750 B2 | 10/2013 | Rangaranjan | |
| 8,646,093 B2 | 2/2014 | Myers | |
| 8,745,040 B2 | 6/2014 | Kowalski | |
| 8,812,539 B2 | 8/2014 | Milousheff | |
| 8,818,994 B2 | 8/2014 | Kowalski | |
| 8,983,982 B2 | 3/2015 | Rangarajan | |
| 9,015,188 B2 | 4/2015 | Behne | |
| 9,037,536 B2 | 5/2015 | Vos | |
| 9,137,115 B2 | 9/2015 | Mayfield | |
| 9,323,801 B2 | 4/2016 | Morozov | |
| 9,412,084 B2 | 9/2016 | Kowalski | |
| 9,467,344 B2 | 10/2016 | Gere | |
| 9,508,051 B2 | 11/2016 | Falk | |
| 9,535,674 B2 | 1/2017 | Cooper | |
| 9,557,969 B2 | 1/2017 | Sharma | |
| 9,613,070 B2 | 4/2017 | Kumar | |
| 9,659,051 B2 | 5/2017 | Hutchins | |
| 9,792,387 B2 | 10/2017 | George | |
| 9,852,165 B2 | 12/2017 | Morozov | |
| 10,002,203 B2 | 6/2018 | George | |
| 2015/0112790 A1* | 4/2015 | Wolinsky | G06Q 20/32 705/14.38 |
| 2015/0142594 A1* | 5/2015 | Lutnick | G06Q 30/0635 705/21 |
| 2019/0018719 A1* | 1/2019 | Brin | H04L 67/40 |
| 2020/0143485 A1* | 5/2020 | Systrom | G06Q 30/0271 |
| 2021/0027360 A1* | 1/2021 | Shmueli | G06Q 30/0635 |

\* cited by examiner

INTEGRATED RECEIVING AND CLASSIFICATION OF COMPUTER HARDWARE

BACKGROUND

Information technology (IT) departments of enterprises may receive a large amount of computer hardware (and possibly other physical items) on a regular basis. Each unit of such hardware may be associated with a serial number, asset tag, purchase order, and/or other data. Once received, this information can be used to track the location and functionality of the hardware as it awaits deployment or is deployed in a network.

SUMMARY

The embodiments herein provide a native mobile application that can assist a non-technical user carry out the reception and cataloging of computer hardware (or other physical items) into a remotely-hosted hardware asset management system. The remotely-hosted system may be a computational instance of a remote network management platform that has access to a database of purchase orders as well as a configuration management database (CMDB). The CMDB may include representations of computer hardware assets. In order to efficiently manage the computer hardware, received shipments of this hardware can be matched to the purchase order(s) thereof by way of the purchase order database, and then this information can be automatically added to the CMDB.

For example, a worker on a loading dock may receive a shipment containing one or more packages. Each package may be marked with a bar code, QR code, asset tag, serial number, or other identifying information. Using the native mobile application, the worker may select a purchase order and/or line item thereof related to one or more of the packages. The native mobile application may prompt the user to capture an image of the identifying information using a camera of the mobile computing device on which the native mobile application is executing. Alternatively, the worker may first capture an image of the identifying information, and in response the native mobile application may find the associated purchase order. Regardless, the native mobile application may update the purchase order database to indicate that the package has been received. From the description of the purchase order, the native mobile application may also automatically create a new entry for the hardware in the CMDB or update an existing entry.

Once the hardware is entered, it can be later discovered and represented as a configuration item, by the remote network management platform (e.g., when the hardware is deployed within the enterprise). This allows additional information from the purchase order to be automatically associated with the configuration item. Advantageously, doing so enables more sophisticated management of the hardware, such as being able to determine when it reaches end-of-life, is subject to a recall, and so on.

Accordingly, a first example embodiment may involve a mobile computing device. The mobile computing device may include a screen, a camera, a communication interface, a processor, and memory. The memory may contain program instructions that cause the processor to execute a native mobile application, wherein the native mobile application is configured to: obtain, by way of the communication interface, a plurality of orders from a computational instance of a remote network management platform, wherein the orders relate to a network managed by the computational instance; display, on the screen, a first graphical user interface depicting one or more of the plurality of orders; receive, by way of the screen, a selection of a particular order from the one or more of the plurality of orders, wherein the particular order includes a line item that has been ordered but not received; display, on the screen, a second graphical user interface depicting the particular order and that the line item has been ordered but not received; capture, by way of the camera, an image of a physical package; determine that a machine-readable representation from the image is associated with the line item; transmit, by way of the communication interface, an update to the computational instance indicating that the line item has been received; and display, on the screen, the second graphical user interface depicting the particular order and that the line item has been received.

A second example embodiment may involve obtaining, by a native mobile application, a plurality of orders from a computational instance of a remote network management platform, wherein the orders relate to a network managed by the computational instance. The second example embodiment may further involve displaying, on a screen of a mobile computing device executing the native mobile application, a first graphical user interface depicting one or more of the plurality of orders. The second example embodiment may further involve receiving, by way of the screen, a selection of a particular order from the one or more of the plurality of orders, wherein the particular order includes a line item that has been ordered but not received. The second example embodiment may further involve displaying, on the screen, a second graphical user interface depicting the particular order and that the line item has been ordered but not received. The second example embodiment may further involve capturing, by way of a camera of the mobile computing device, an image of a physical package. The second example embodiment may further involve determining, by the native mobile application, that a machine-readable representation from the image is associated with the line item. The second example embodiment may further involve transmitting, by the native mobile application, an update to the computational instance indicating that the line item has been received. The second example embodiment may further involve displaying, on the screen, the second graphical user interface depicting the particular order and that the line item has been received.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
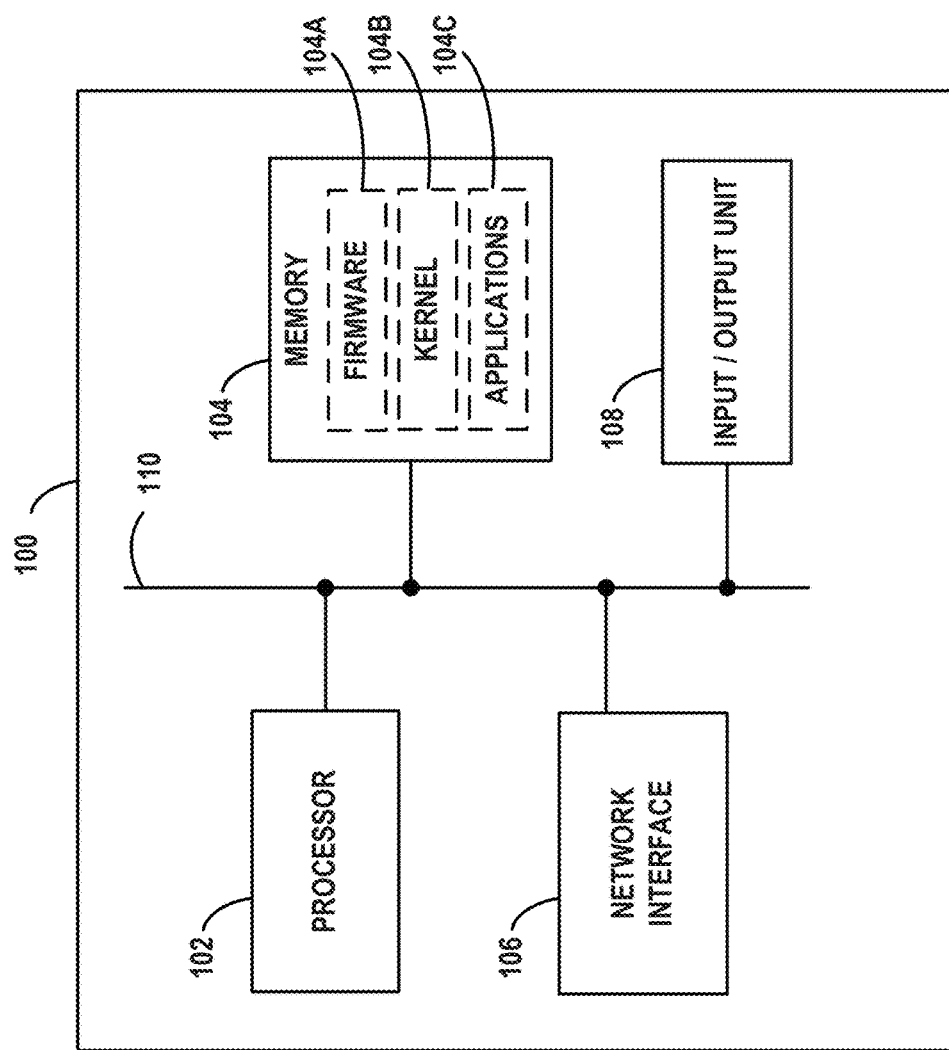
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
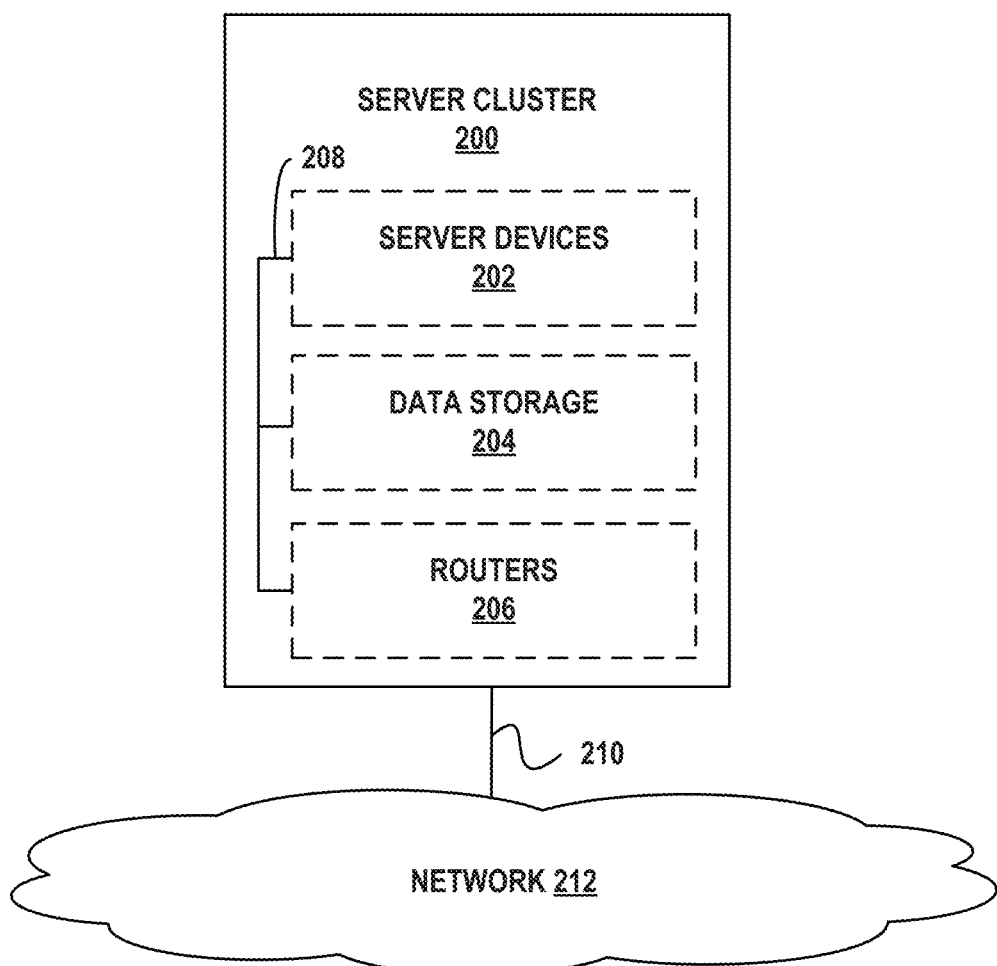
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages.

III. Example Remote Network Management Architecture

Figure 3:
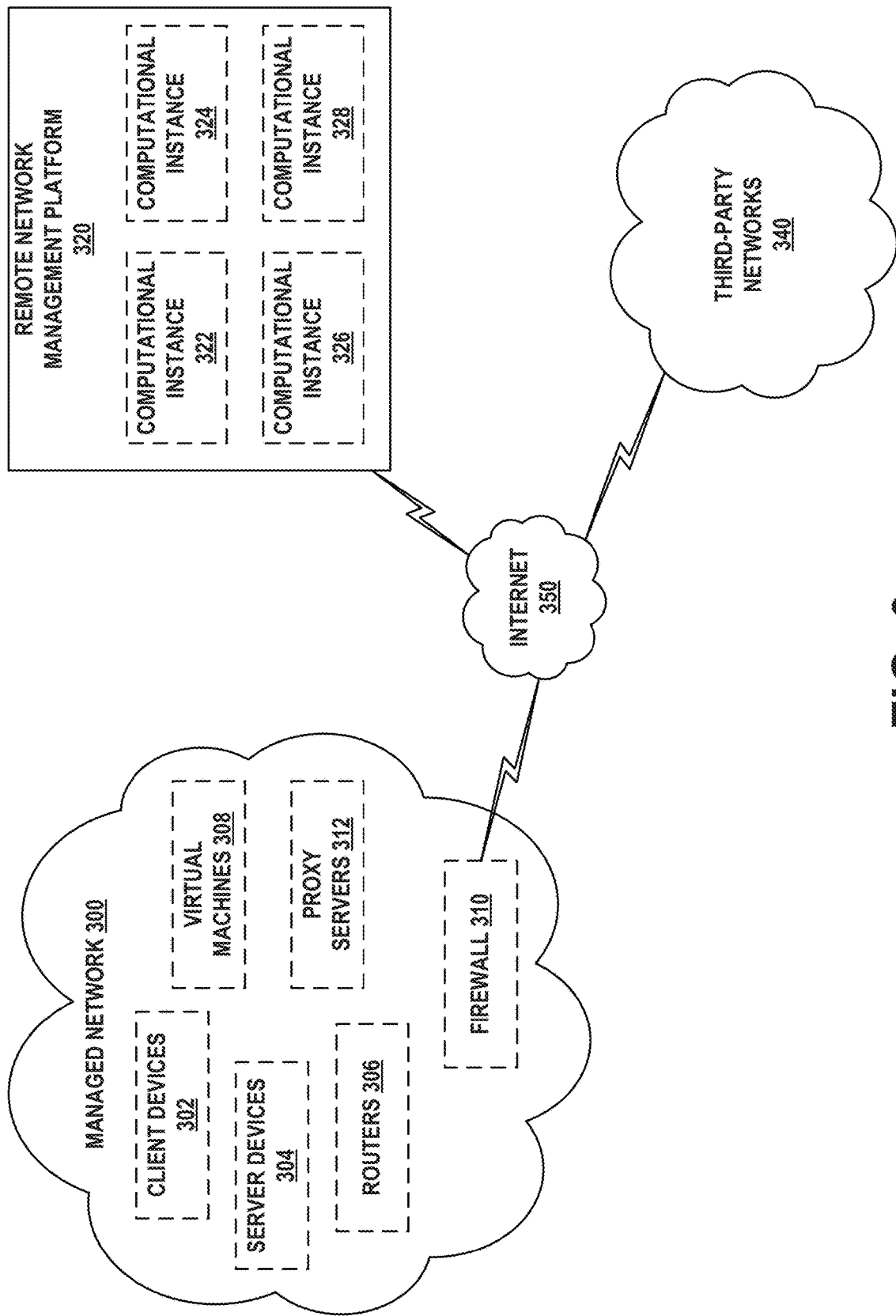
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent one or more server devices and/or one or more databases that provide a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows with one or more database tables).

For purpose of clarity, the disclosure herein refers to the physical hardware, software, and arrangement thereof as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of physical or virtual servers and database devices. Such a central instance may serve as a repository for data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® AZURE®. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
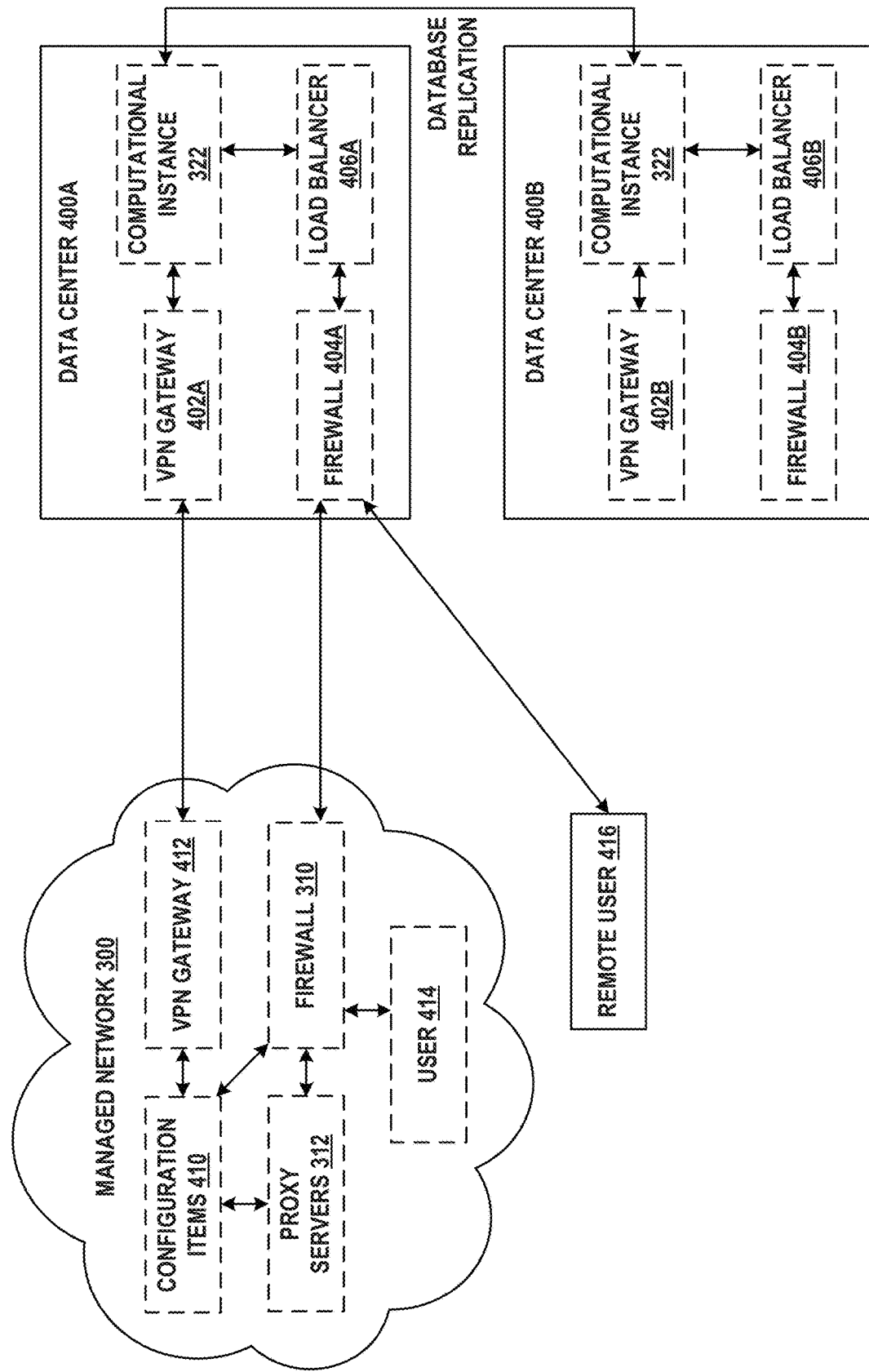
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
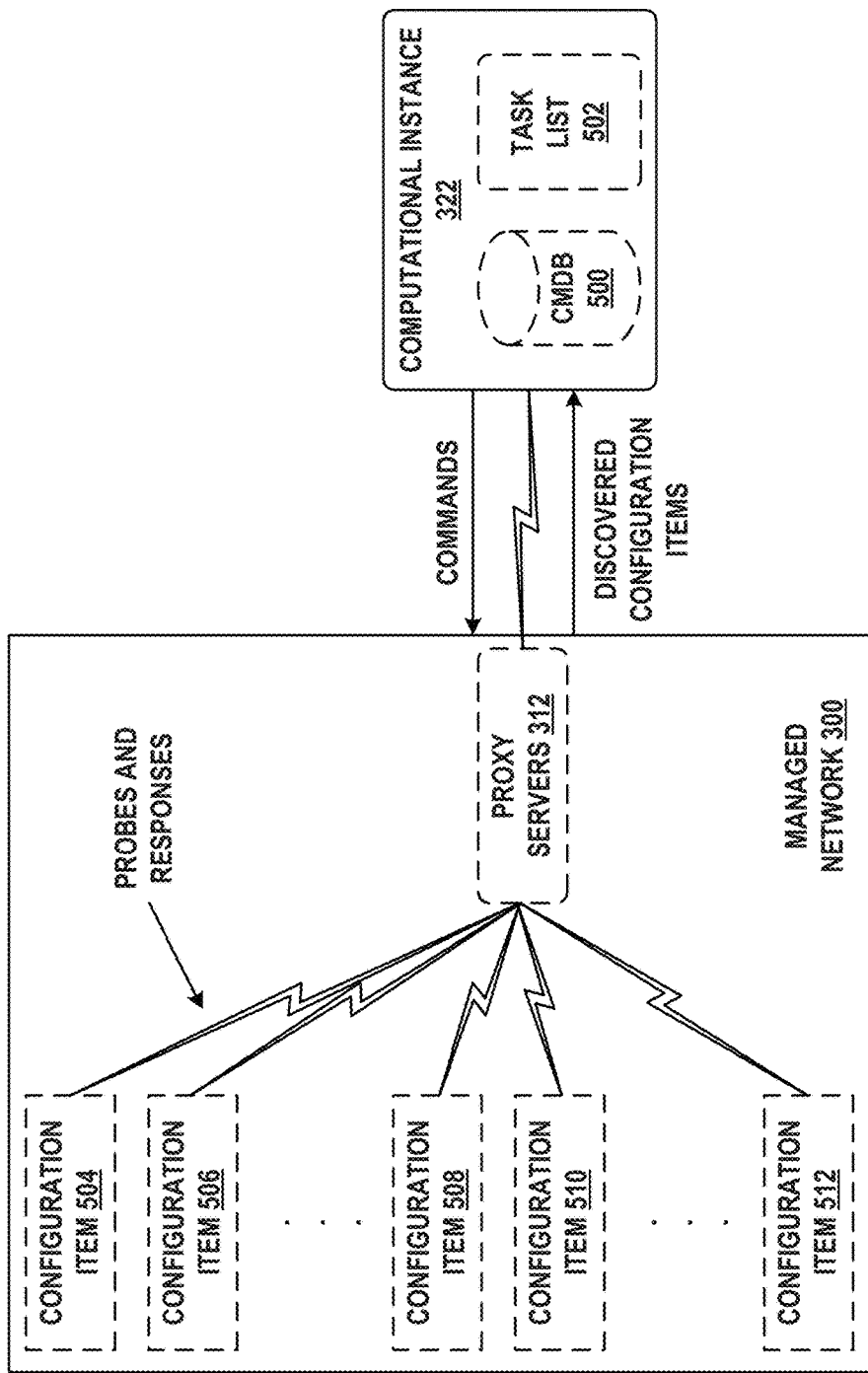
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
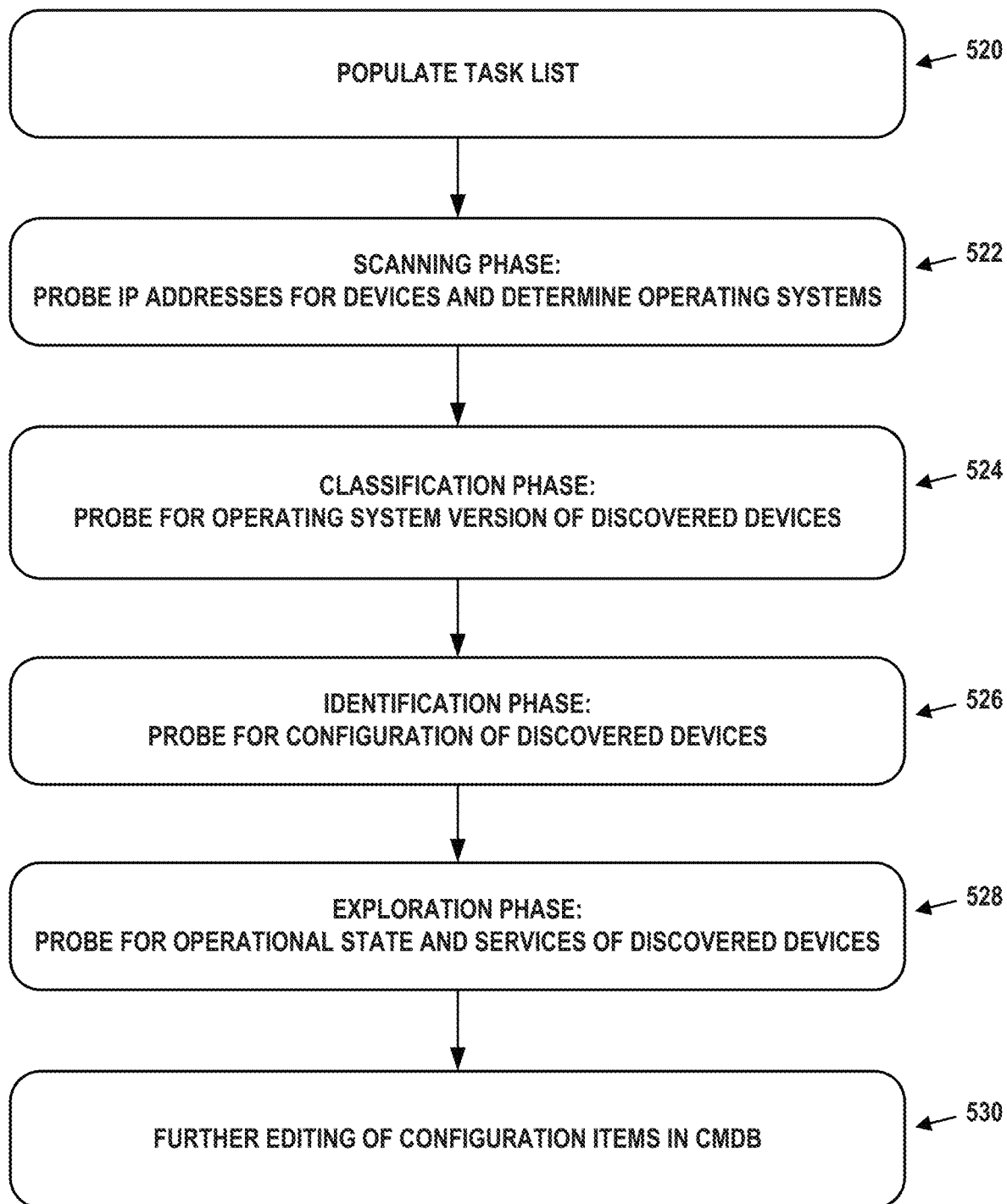
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. Example Mobile Computing Device

Figure 6:
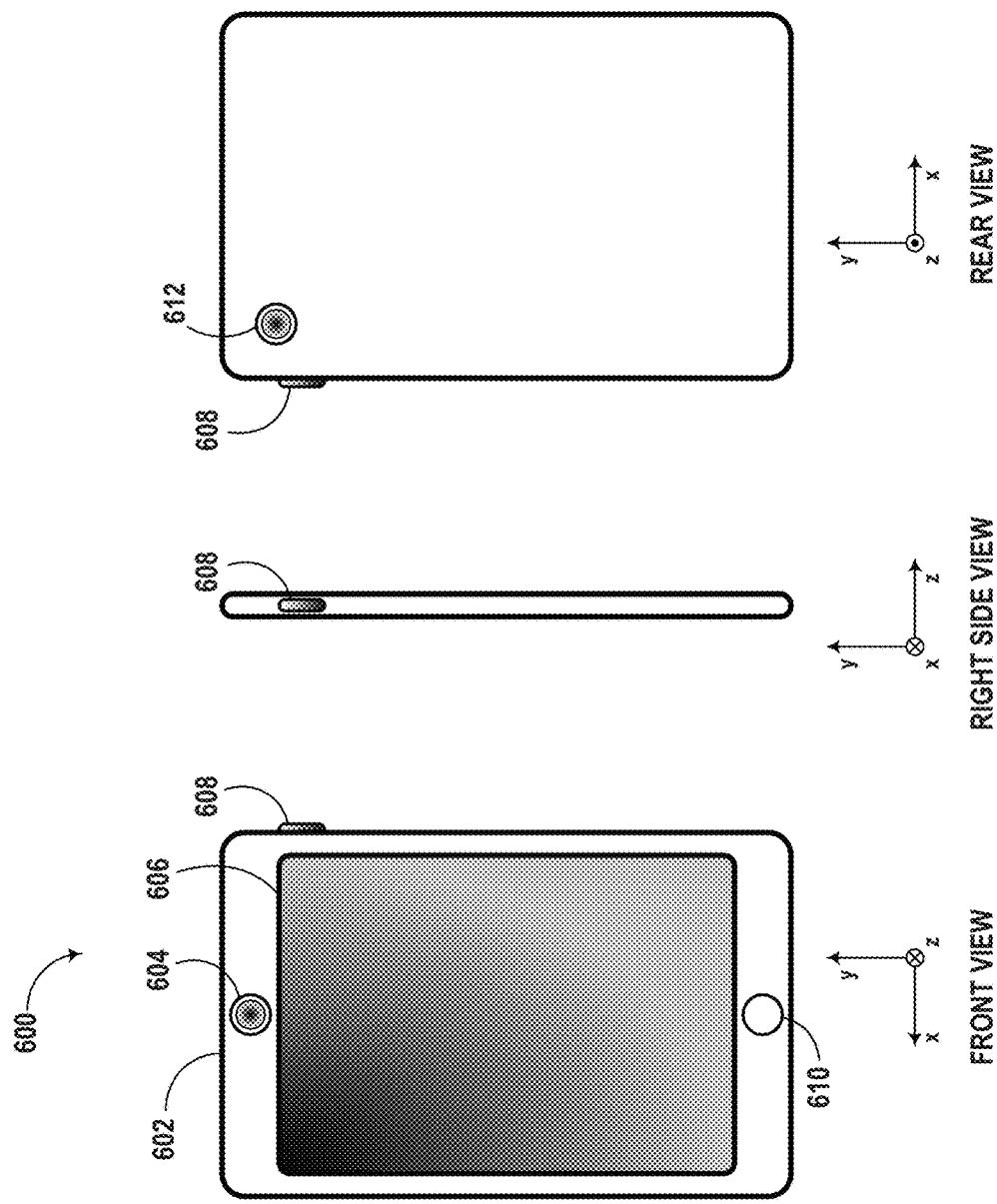
FIG. 6 depicts a wireless computing device, in accordance with example embodiments.

FIG. 6 illustrates the form factor of a mobile computing device 600. Mobile computing device 600 may be, for example, a cellular phone, a tablet computer, network-enabled digital camera, or a wearable computing device. However, other embodiments are possible.

Mobile computing device 600 may include various elements, such as a body 602, a front-facing camera 604, a screen 606, a button 608, and a button 610. Mobile computing device 600 could further include a rear-facing camera 612. Front-facing camera 604 may be positioned on a side of body 602 typically facing a user while in operation, or on the same side as screen 606. Rear-facing camera 612 may be positioned on a side of body 602 opposite front-facing camera 604. Referring to the cameras as front and rear facing is arbitrary, and mobile computing device 600 may include multiple cameras positioned on various sides of body 602.

Screen 606 could represent a cathode ray tube (CRT) display, a light emitting diode (LED) display, an organic light emitting diode (OLED) display, an active-matrix organic light emitting diode (AMOLED) display, a liquid crystal (LCD) display, a plasma display, or any other type of display known in the art. In some embodiments, screen 606 may display a digital representation of a graphical user interface and/or the current image being captured by front-facing camera 604 and/or rear-facing camera 612. Screen 606 may also support touchscreen and/or presence-sensitive functions that may be able to adjust the settings and/or configuration of any aspect of mobile computing device 600.

Front-facing camera 604 may include an image sensor and associated optical elements such as lenses. Front-facing camera 604 may offer zoom capabilities or could have a fixed focal length. In other embodiments, interchangeable lenses could be used with front-facing camera 604. Front-facing camera 604 may have a variable mechanical aperture and a mechanical and/or electronic shutter. Front-facing camera 604 also could be configured to capture still images, video images, or both. Further, front-facing camera 604 could represent a monoscopic, stereoscopic, or multiscopic camera. Rear-facing camera 612 may be similarly or differently arranged. Additionally, front-facing camera 604, rear-facing camera 612, or both, may be an array of one or more cameras.

Either or both of front facing camera 604 and rear-facing camera 612 may include or be associated with an illumination component that provides a light field to illuminate a target object. For instance, an illumination component could provide flash or constant illumination of the target object. An illumination component could also be configured to provide a light field that includes one or more of structured light, polarized light, and light with specific spectral content. Other types of light fields known and used to recover three-dimensional (3D) models from an object are possible within the context of the embodiments herein.

Either or both of front-facing camera 604 and rear-facing camera 612 may include or be associated with an ambient light sensor that may continuously or from time to time determine the ambient brightness of a scene that the camera can capture. In some devices, the ambient light sensor can be used to adjust the display brightness of screen 606. When the determined ambient brightness is high, the brightness level of screen 606 may be increased to make the screen easier to view. When the determined ambient brightness is low, the brightness level of screen 606 may be decreased, also to make screen 606 easier to view as well as to potentially save power. Additionally, the ambient light sensor's input may be used to determine an exposure length of an associated camera, or to help in this determination.

Mobile computing device 600 could be configured to use screen 606 as a viewfinder for either front-facing camera 604 or rear-facing camera 612, and thereby capture images of a target object. The captured images could be one or more still images or a video stream. The image capture could be triggered by activating button 608, button 610, pressing a softkey on screen 606, or by some other mechanism. Depending upon the implementation, the images could be captured automatically at a specific time interval, for example, upon pressing button 608, upon appropriate lighting conditions of the target object, upon moving mobile computing device 600 a predetermined distance, or according to a predetermined capture schedule.

Mobile computing device 600 may also contain elements and features of a computing device that are not explicitly shown in FIG. 6, such as a wireless communication interface (e.g., to access local-area or wide-area wireless networks), a graphical user interface displayable upon screen 606, one or more processors, one or more units of memory, and so on. Mobile computing device 600 may also be configured to execute one or more native mobile applications (e.g., software applications specifically designed for use on a mobile computing device with intermittent network connectivity and limited screen size), and well as to store data associated with these applications.

Notably, the form factor and components shown for mobile computing device 600 are for purposes of example. A wide variety of other form factors and components may be used.

VI. Example Receiving and Classification of Computer Hardware

As noted above, medium and large enterprises may purchase a great deal of computer hardware and other physical items that are shipped to the enterprise. In some cases, the enterprise may continuously, or almost continuously, have open purchase orders for various pieces of equipment. Managing and tracking these purchase orders can be accomplished by way of purchase order software deployed in a network. For example, computational instance 322 of remote network management platform 320 may provide web-based interfaces for managing and tracking purchase orders.

Nonetheless, such web-based interfaces are not easily adapted to the limited screen size of a mobile device, such as mobile computing device 600. Thus, workers in a receiving dock are often forced to suffer through a web-based mobile experience that is difficult to use and navigate, or to manually enter data into computational instance 322 by way of a separate desktop or laptop computer. Not only does this increase the possibility of errors, but it also takes more time to accomplish, possibly straining a department that is already busy. Further, while dedicated bar code readers could be used to facilitate receiving, these readers would have to be integrated into and communicate with remote network management platform 320 in order for the system to reach its full potential and to facilitate further automation.

None of these existing solutions provide an integrated, end-to-end receiving and purchase order management solution that is seamless and easy for non-technical users to employ. The embodiments herein overcome these limitations by providing a native mobile application that integrates with remote network management platform 320 and provides a simple, intuitive graphical user interface for purchase order management.

Further, the embodiments herein allow information from a purchase order to be used to automatically create configuration item records in a CMDB. For computer hardware purchases, this feature is particularly useful as these configuration items can be populated with information regarding the computer hardware (e.g., serial numbers, vendors, capabilities, licenses, configurations) that would otherwise be absent.

Figure 7:
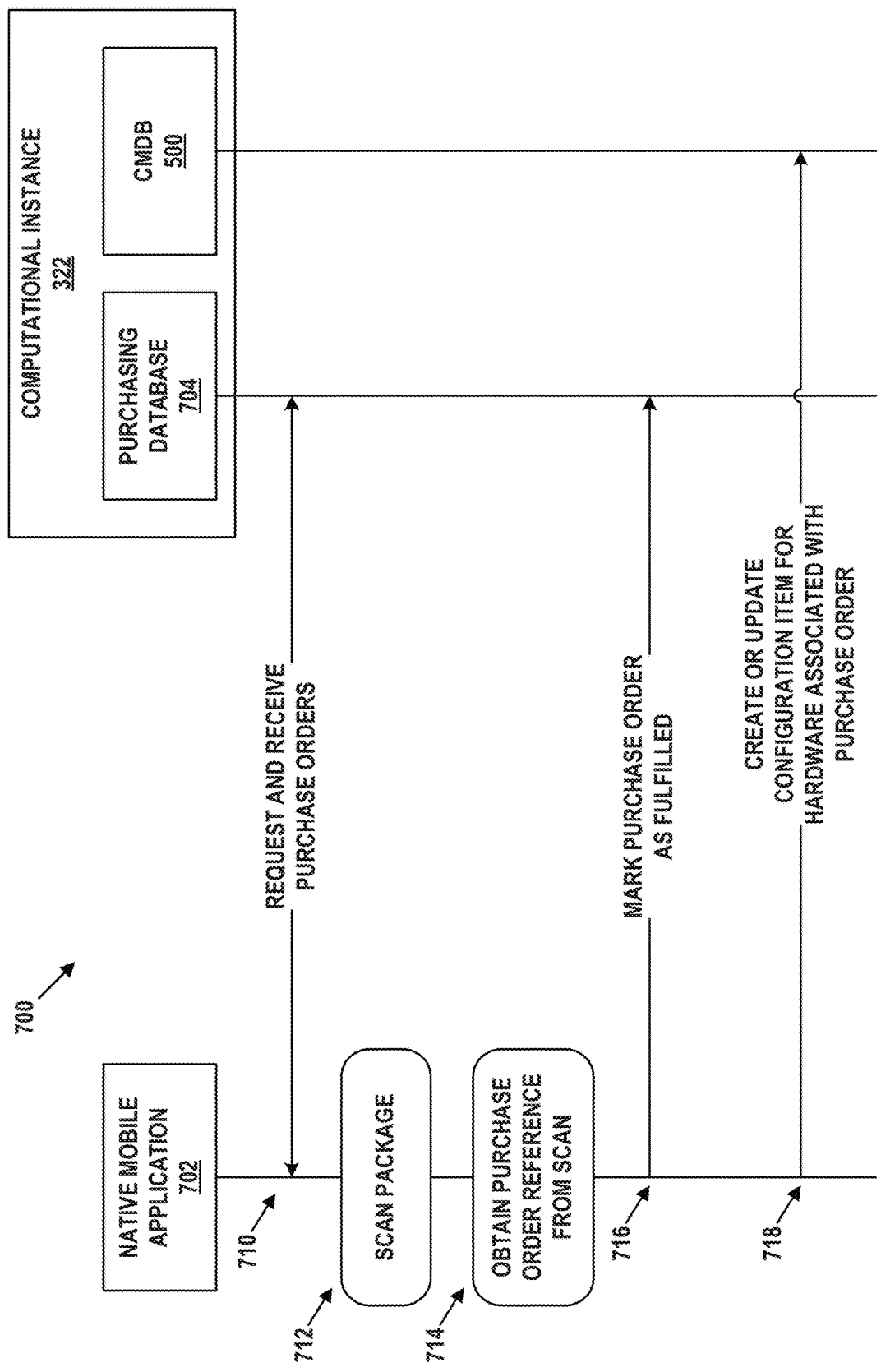
FIG. 7 depicts a message flow diagram, in accordance with example embodiments.

FIG. 7 is a message flow diagram 700 that illustrates a transaction between native mobile application 702 and computational instance 322. Native mobile application 702 may be executing on a mobile computing device, such as mobile computing device 600. Computational instance 322 includes purchasing database 704 and CMDB 500. In some embodiments these two databases may be integrated with one another into the same database.

At step 710, native mobile application 702 requests and receives, from purchasing database 704, a list of purchase orders. Each purchase order may include references to a vendor providing the purchased item or items (e.g., the manufacturer or supplier thereof), a unique purchase order number, one or more unique shipping identifiers that may be machine-readable (e.g., a bar code, QR code, asset tag, serial number, or another indicator), a status of the purchase order (e.g., ordered, shipped, delivered, delayed) a date and time indicating when the item or items is supposed to arrive, and/or the location at which the item or items is supposed to arrive. Some purchase orders for computer hardware may include specific information regarding the hardware, such as serial number(s), model number(s), amount of memory, number and type of processors, types of interfaces, screen size, and so on.

After step 710 completes, a list of the purchase orders can displayed by native mobile application 702. This list may include just a few details about each purchase order so that space on screen 606 of wireless computing device 600 is conserved. This list may be searchable and otherwise navigable to display further purchase orders.

At step 712, native mobile application 702 is used to scan a received package. In some cases, the user may navigate through the list of purchase orders to a specific purchase order or line item thereof associated with the package before scanning the package.

The package may be a shipment received at the enterprise. The package may be tagged with some form of bar code, QR code, asset tag, serial number, or other indicator that uniquely identifies the package. Native mobile application 702 may use one of camera 604 or camera 612 to scan (e.g., capture an image) of this information.

At step 714, native mobile application 702 may obtain a purchase order reference from the captured image. For example, the image may be processed to identify textual and numerical characters, or may be processed to identify a bar code or QR code. If a purchase order has not already been selected, native mobile application 702 may search the purchase orders obtained in step 710 to identify a purchase order associated with the information in the scanned image. This may involve comparing the purchase order reference from the captured image to the shipping identifiers in the purchase orders in purchasing database 704 (e.g., those stored locally on mobile computing device 600) until a match is found.

Regardless, at step 716, native mobile application 702 marks the matching purchase order as fulfilled, and updates purchasing database 704 according. In some cases a single purchase order may result in multiple packages being shipped, and the purchase order is not considered fulfilled until all packages (e.g., each package represented as a line item of the purchase order) are received and scanned in the fashion described herein.

In the case that computer hardware was received, native mobile application 702 may, at step 718, communicate with CDMB 500 to create or update a configuration item for the hardware. As noted above, serial number(s), model number(s), amount of memory, number and type of processors, types of interfaces, screen size, and so on can be included as attributes of the configuration item. Alternatively, computational instance 322 may create or update the configuration item from information provided to purchasing database 704.

Once the computer hardware is deployed within managed network 300, it can be discovered by the discovery procedures described in the context of FIGS. 5A and 5B. The information provided from the purchase order (e.g., vendor, purchase date, warranty period), may be difficult or impossible to obtain by way of discovery. Thus, step 718 facilitates CMDB 500 being updated with information that would be otherwise difficult or cumbersome to attain therein. Regardless, step 718 is not required and can be omitted from these embodiments without reducing their utility.

FIGS. 8A, 8B, 8C, 8D, 8E, 8F, 8G, 8H, 8I, and 8J depict possible graphical user interfaces (GUIs) of the native mobile application. These GUIs are for purposes of example, and thus may be simplified accordingly. Further, the content and location of information within the GUIs may vary without departing from the disclosed embodiments.

Additionally, the mobile application depicted in these figures may be considered "native," in that it is compiled specifically for a particular type of mobile device and/or mobile device operating system or environment. Native mobile applications have more flexibility in terms of how information is presented than, for example, web-based applications (web apps) that are accessed by way of a web browser and that may execute at least partially within the web browser. Notably, a browser-based web app may be difficult for a user to navigate due to small text size, links that are difficult to activate, and having to access a server in order to change what is being displayed. Native mobile applications can focus on presenting only the information that is deemed to be most important to the user, and do so with navigation that is intuitive and simple, and might not have to rely on information from a server in order to display new screens or pages of the GUIs.

Figure 8A:
FIGS. 8A, 8B, 8C, 8D, 8E, 8F, 8G, 8H, 8I, and 8J are graphical user interfaces, in accordance with example embodiments.

FIG. 8A depicts GUI 800 of a native mobile application. This application may be configured to perform the functions of native mobile application 702, for example. Various units of text, boxes of text, panes, and/or other user interface elements within GUI 800 may be activated in order to change what is displayed on GUI 800 or to move to a different GUI.

GUI 800 depicts a list of purchase orders as shown in purchase order views 804, 806, 808, and 810. These purchase orders are expected to be fulfilled in the next 30 days, as indicated by header 802. Header 802 also contains a "back" button or link that may cause GUI 800 to display a home screen. For purposes of simplicity, such a home screen is not depicted in the figures.

As shown, purchase order view 804 indicates that the associated purchase order is pending delivery, and has a purchase order number of PO0000007. The vendor supplying the goods for the purchase order is Teradyne, Inc., and the delivery of these goods is due on Apr. 6, 2019, at 2:30 PM at an enterprise's southern California warehouse. Similar information is available for the purchase orders of purchase order views 806, 808, and 810.

Figure 8B:

Further, purchase order view 804 is shown as being selected by the user, as indicated by it having thicker surrounding lines. Such selection may cause the native mobile application to display GUI 812, as depicted in FIG. 8B.

In particular, GUI 812 displays more detailed information about the selected purchase order. Header 814 indicates that GUI 812 contains information related to a single purchase order, and also contains a back button or link to return to GUI 800.

Purchase order view 816 contains the same general information as purchase order view 804, but also contains three buttons for details about this purchase order, activity related to the purchase order, and a related list of purchase order line items. Notably, a single purchase order may refer to multiple physical products, each in a different line item.

In purchase order view 816, the activity button has been selected by the user, as indicated by it having thicker surrounding lines and by its text being underlined. Accordingly, detailed display 818 is shown. Detailed display 818 indicates that the item(s) being purchased includes an AirTablet 3.0, the purchase order is assigned to Robert J. Smith, the purchased item's status is that it has shipped, the purchase order was requested on Mar. 31, 2019 at 2:45:09 PM, and the purchase order was placed on Mar. 31, 2019 at 10:58:23 PM.

Figure 8C:
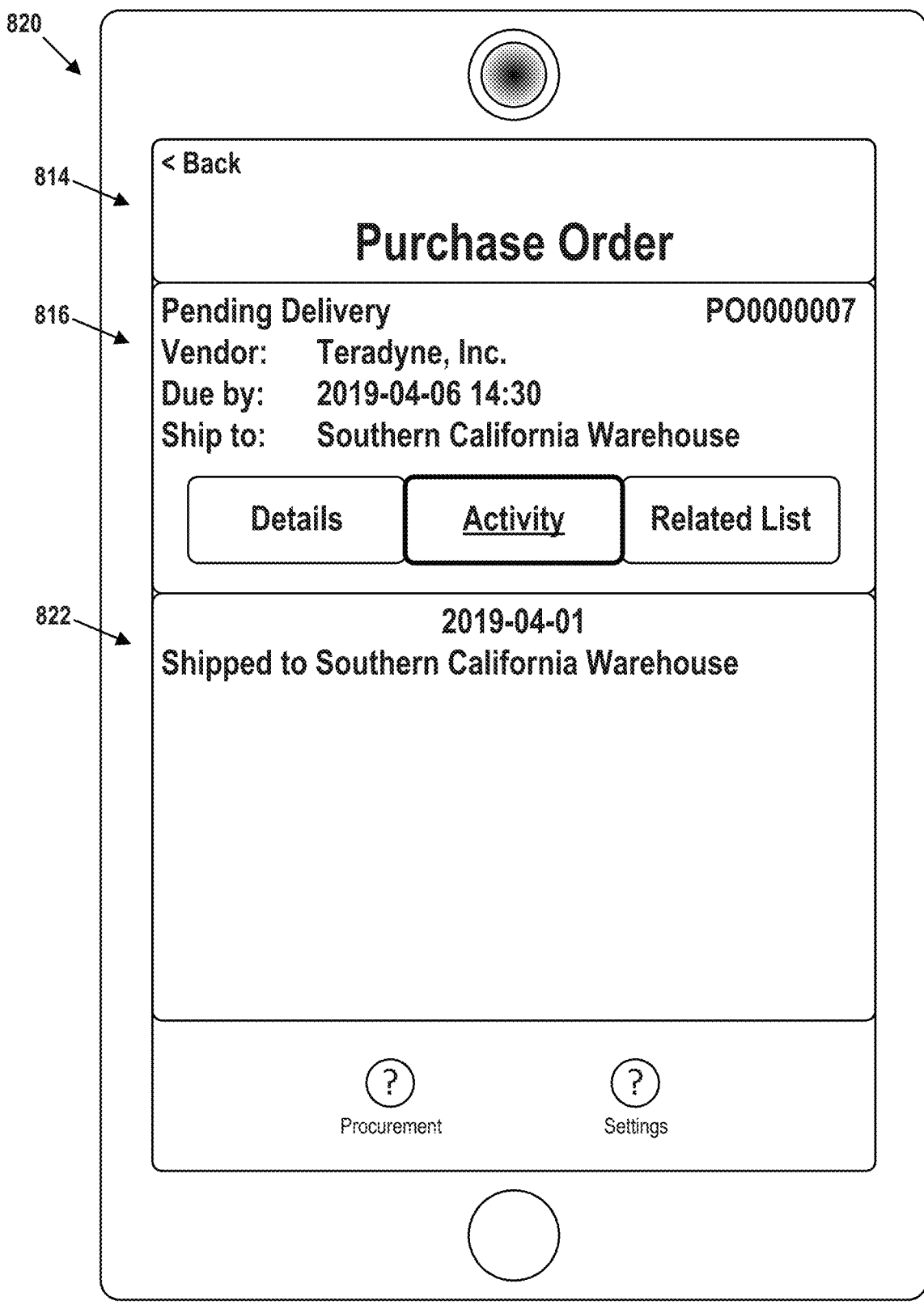

If the user selects the activity button, the native mobile application may display GUI 820, as depicted in FIG. 8C. Like GUI 812, GUI 820 contains header 814 and purchase order view 816. But GUI 820 also contains activity stream 822 (which may be referred to as a temporal activity stream). This activity stream may include representations of activities associated with the shipping and/or receiving of the items in the purchase order. For example, activity stream 822 may indicate when the items were shipped and/or received, any delays in delivery, as well as other information including manually entered notes and images. As shown in GUI 820, activity stream 822 indicates that the items were shipped to the southern California warehouse on Apr. 1, 2019.

Figure 8D:
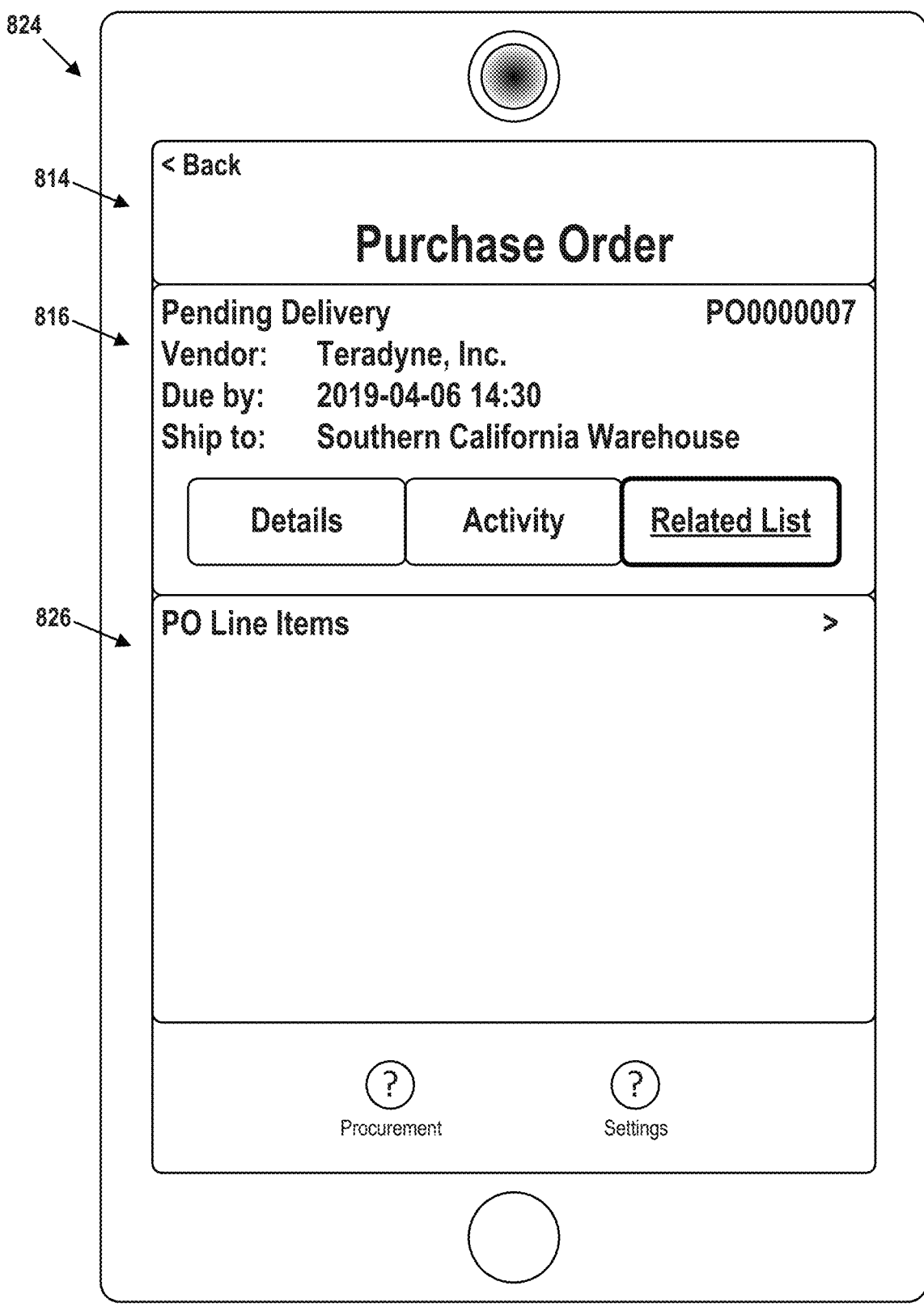

If the user selects the related list button from either GUI 812 or GUI 820, the native mobile application may display GUI 824, as depicted in FIG. 8D. Like GUI 812 and GUI 820, GUI 824 contains header 814 and purchase order view 816. But GUI 824 also contains related list 826. In GUI 824, related list 826 only contains a button or link to a list of one or more purchase order line items. In some embodiments, related list 826 may contain more or different information.

Figure 8E:
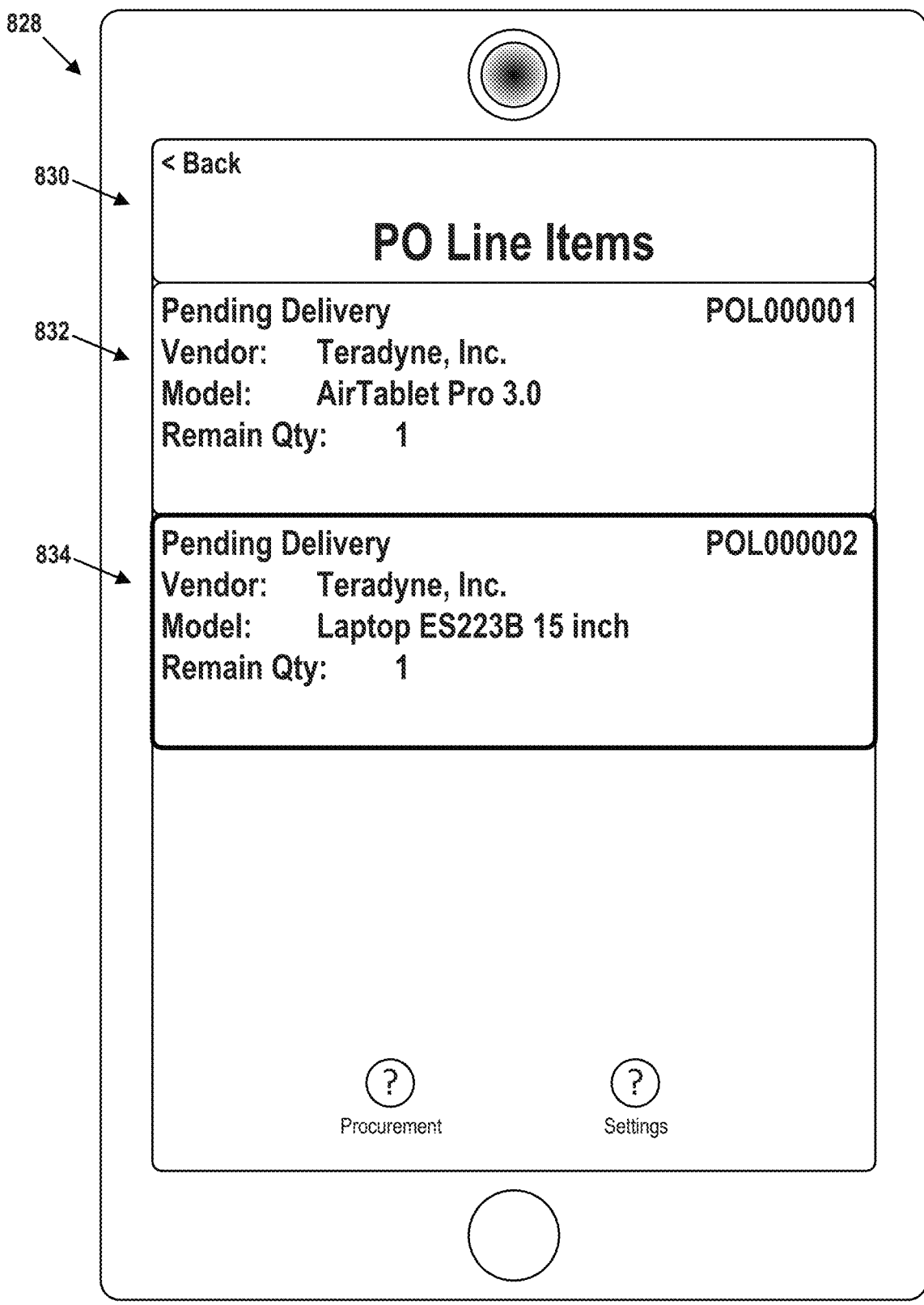

If the user selects related list 826 from GUI 824, the native mobile application may display GUI 828, as depicted in FIG. 8E. GUI 828 includes header 830, indicating that GUI 828 represents purchase order line items (in particular, the line items of purchase order PO0000007). Header 830 also contains a back button or link that can be used to navigate to GUI 824. GUI 828 further includes line items 832 and 834. As an example, line item 834 relates to a pending delivery with a purchase order line item number of POL000002, from the vendor Teradyne, Inc. The line item is a product referred to as "Laptop ES223B 15 inch", and the remaining quantity is 1. This remaining quantity indicates the number of instances of this product that has been ordered but has not yet been received. When the remaining quantity reaches zero, the line item is fulfilled.

Figure 8F:
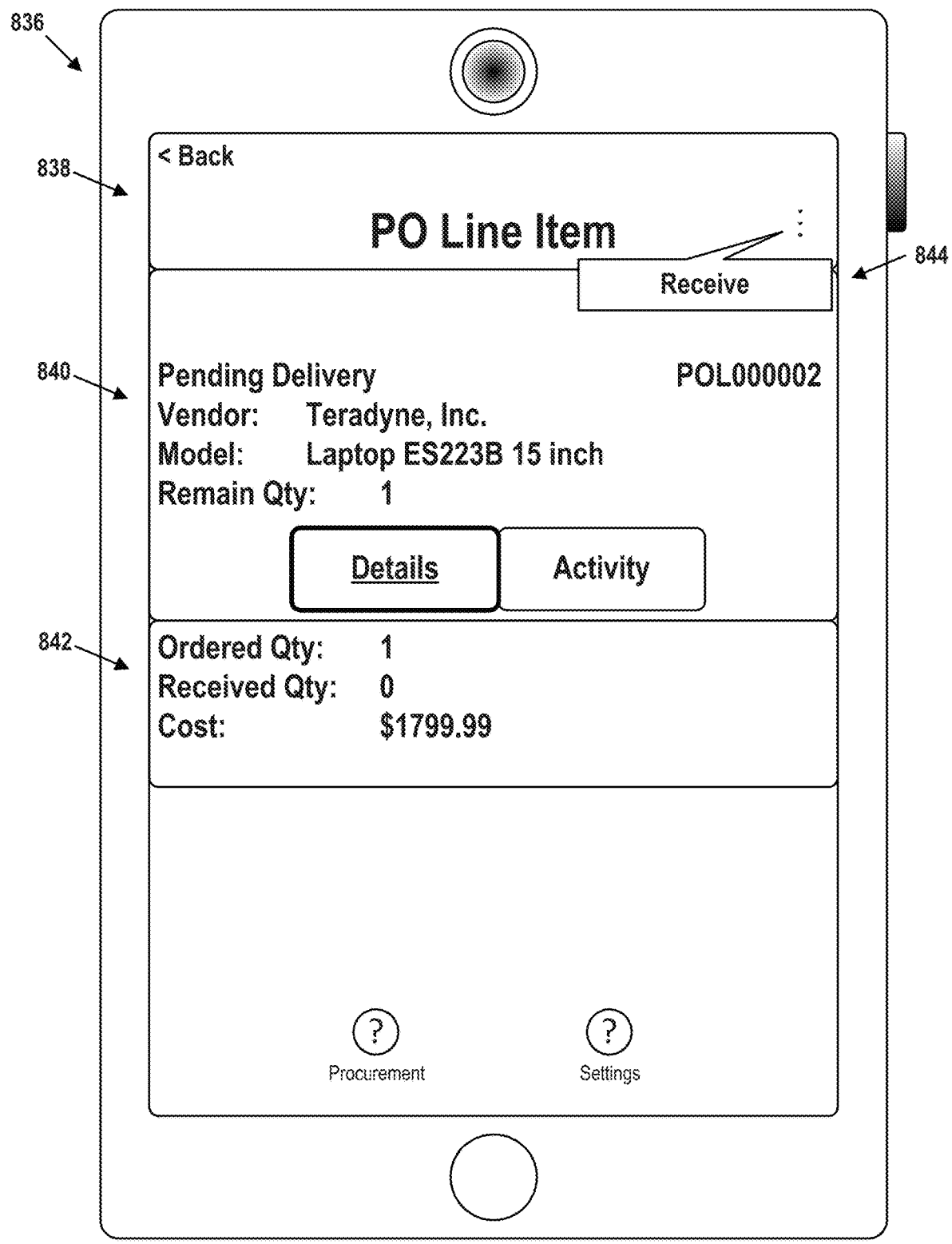

Further, line item 834 is shown as being selected by the user, as indicated by it having thicker surrounding lines. Such selection may cause the native mobile application to display GUI 836, as depicted in FIG. 8F. GUI 836 includes header 838, indicating that GUI 836 represents a single purchase order line item (in particular, the purchase order line item POL000002). Header 838 also contains a back button or link that can be used to navigate to GUI 828. Header 838 further includes three vertically-arranged dots indicating an interactive menu, which will be discussed below.

GUI 836 also includes purchase order general information 840 and purchase order details 842. Purchase order general information 840 contains largely the same information as line item 834, but also includes details and activity buttons.

In GUI 836, the details button is shown as selected by the user, as indicated by it having thicker surrounding lines and by its text being underlined. Accordingly, purchase order details 842 contains further information regarding the purchase order, including the ordered quantity, the received quantity, and the cost. The activity button, when activated, may cause GUI 836 to display an activity stream similar to activity stream 822 (not shown).

As noted above, the three vertically-arranged dots in header 838 can be selected to display drop-down menu 844. While this menu is shown having only one option, multiple options may be available in some embodiments. The option in drop-down menu 844 is to receive a purchase order line item. This option would normally be selected when a user has possession of one or more packages associated with this purchase order line item.

Figure 8G:
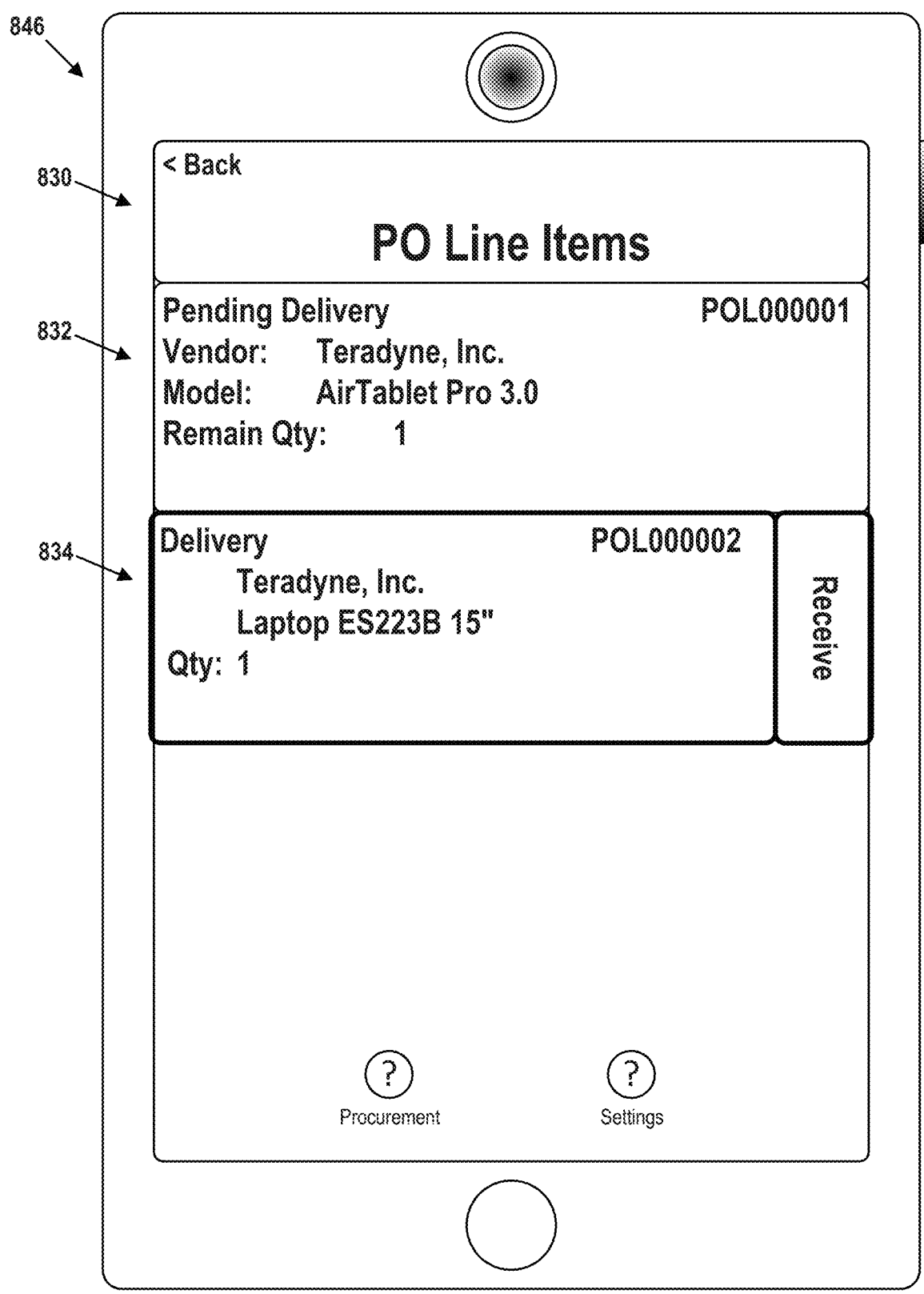

GUI 846 of FIG. 8G depicts an alternative embodiment for receiving a package. GUI 846 is essentially identical to GUI 828 of FIG. 8E, but shows a user receiving a package by swiping left on the associated line item. Such a swipe may be a touchscreen activity in which the user places his or her finger on the line item and drags it some extent to the left. Doing so may cause the word "receive" to appear on the right side of the line item, as shown in FIG. 8G.

Figure 8H:
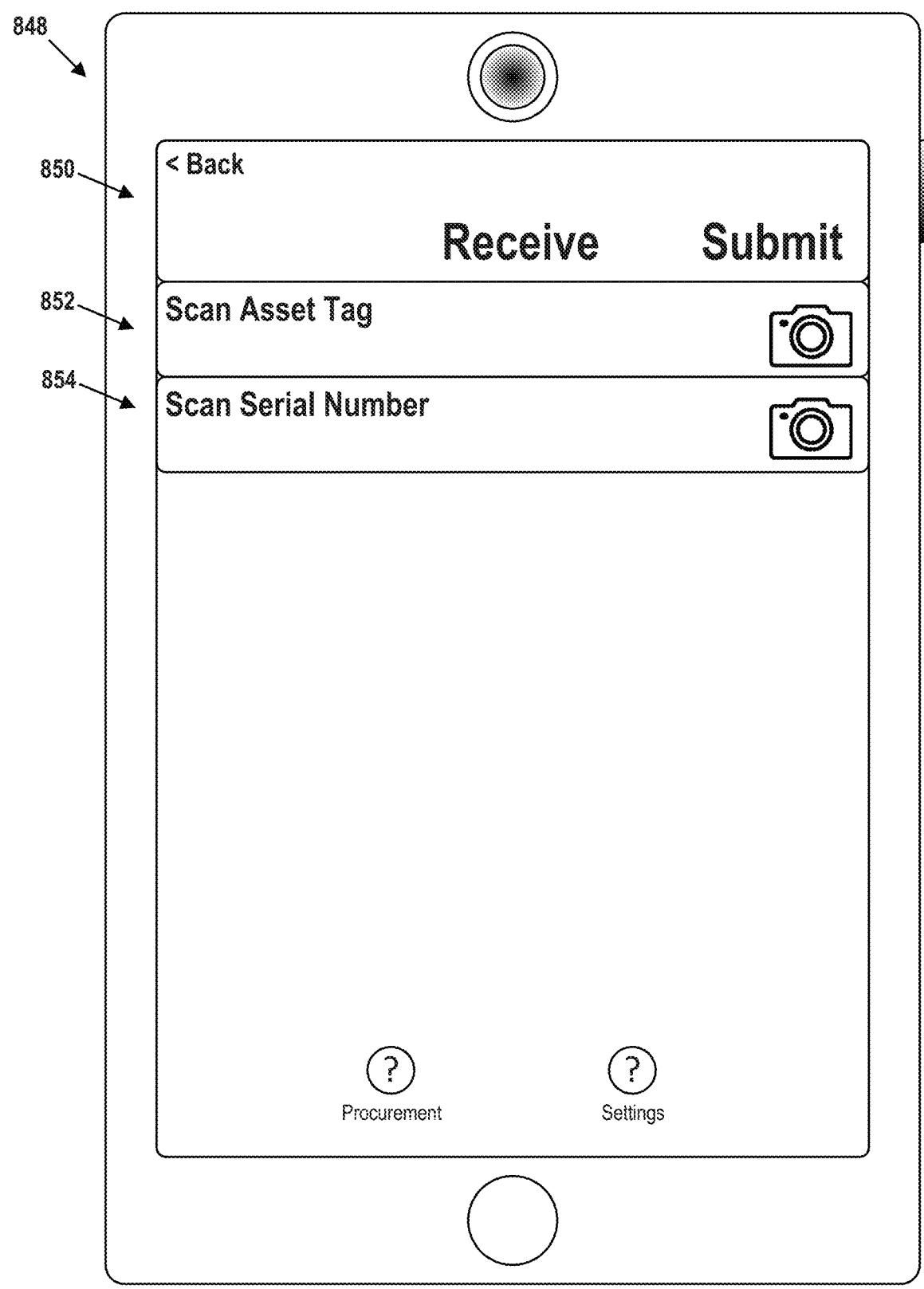

Regardless of how the package is received, selecting such an action from either GUI 836 or GUI 846 may cause the native mobile application to display GUI 848 as depicted in FIG. 8H. In GUI 848, header 850 and options 852 and 854 are present. Header 850 indicates that GUI 848 is related to receiving. Option 852 allows the user to use a camera of the mobile device on which the native mobile application is executing to capture an image (take a picture) of an asset tag. Option 854 allows the user to use the camera to capture an image of a serial number. The asset tag and/or the serial number may be externally visible on the package being received. For example, selecting the camera icon to the right of either of these options may open the camera application in viewfinder mode so that the user can capture the appropriate image. Once the image has been captured, it is associated with the line item and the native mobile application may return to GUI 828, GUI 836, or another GUI. The image may serve as a way to verify that the package has in fact been received.

Figure 8I:
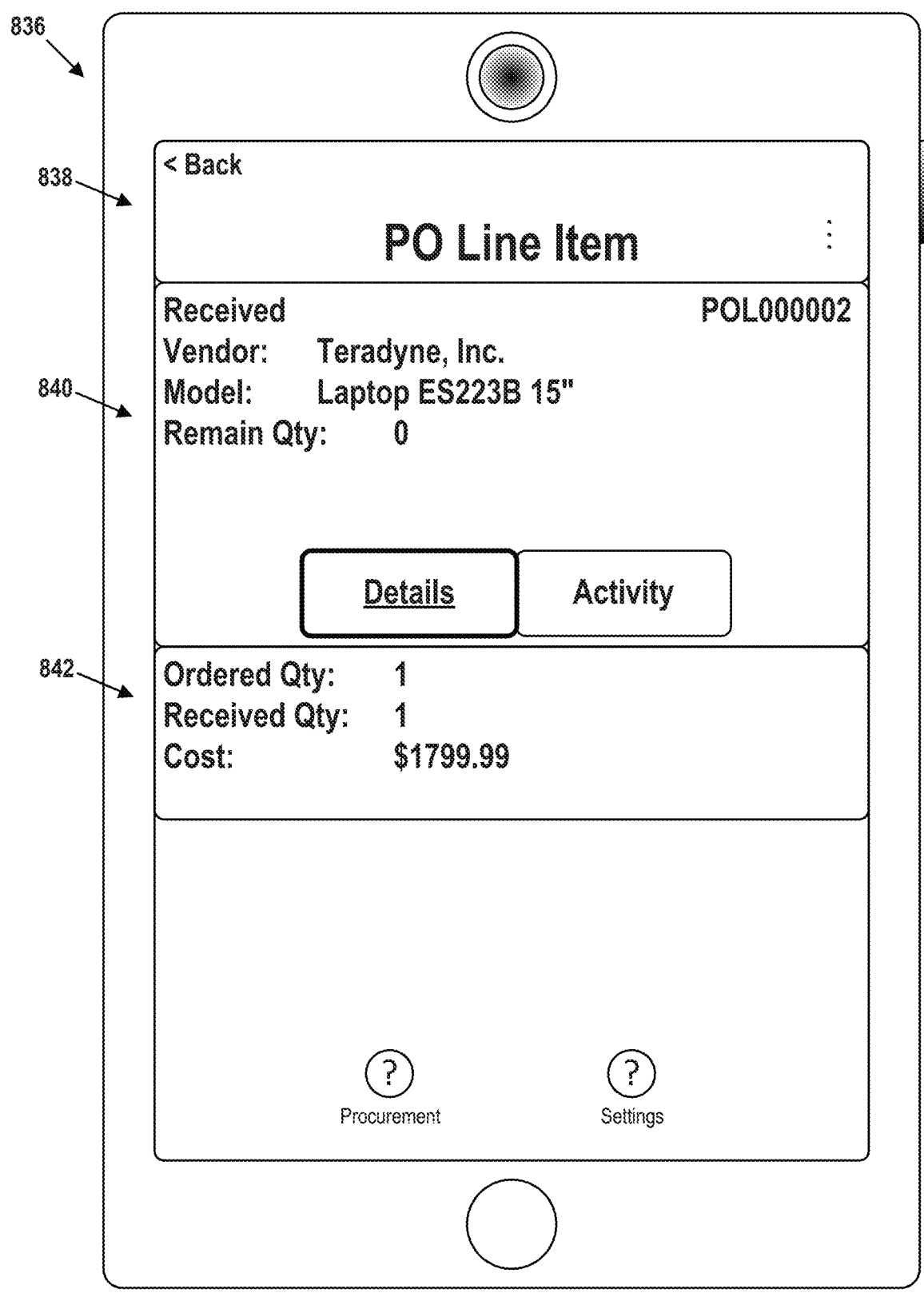

To that point, FIG. 8I depicts another view of GUI 836, this time after the line item POL000002 has been received. Notably, purchase order general information 840 shows that the remaining quantity is zero and purchase order details 842 shows that the received quantity is 1.

Figure 8J:
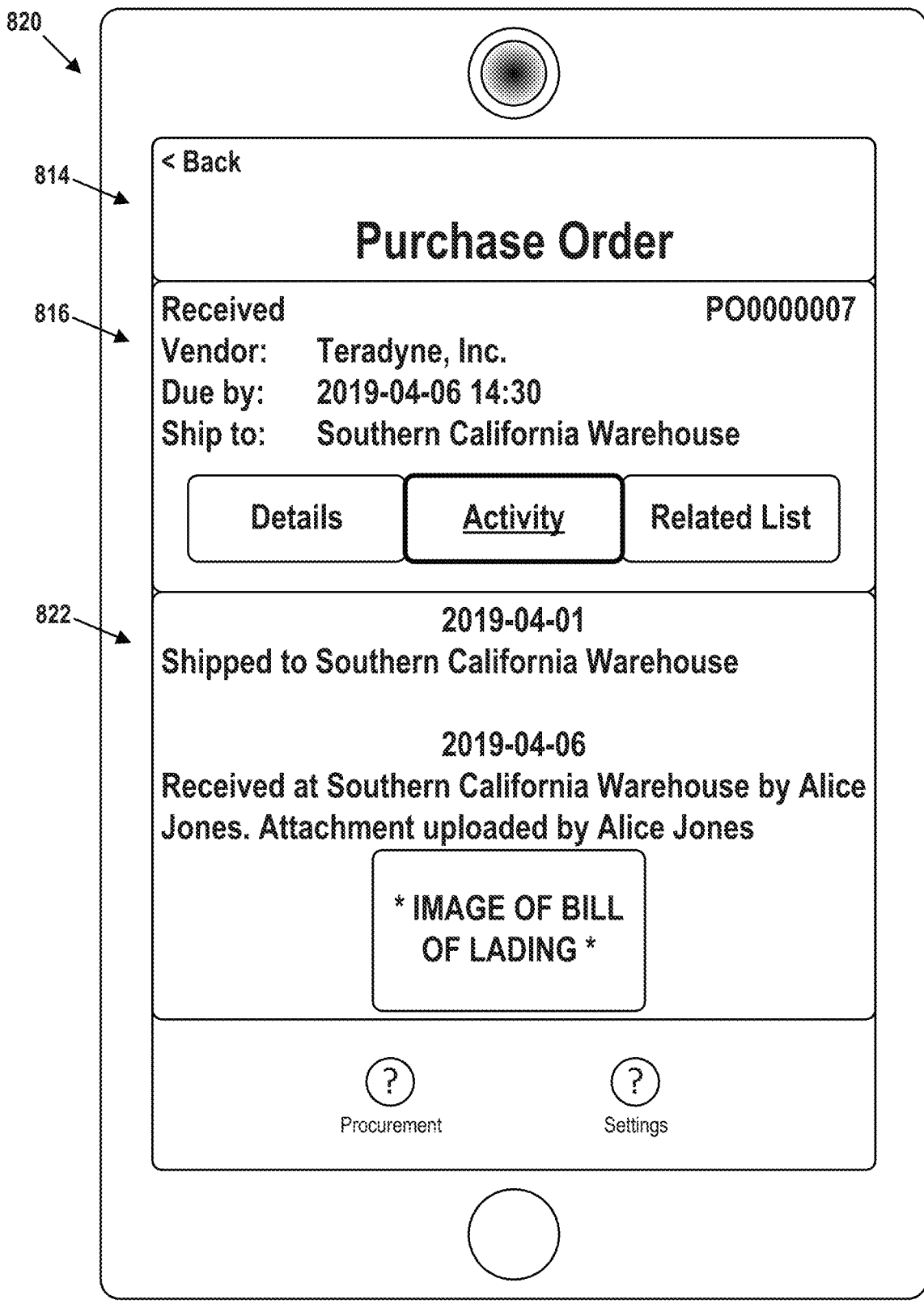

FIG. 8J depicts another view of GUI 820, this time with activity stream 822 updated. In particular, an entry for Apr. 6, 2019 has been made indicating that the entire purchase order has been fulfilled. Also, the user has attached an image of a bill of lading associated with the purchase order. This allows a record of the shipment to be associated with the purchase order, and the physical bill of lading can be discarded if desired. The user who attached the image (Alice Jones) is also identified in activity stream 822.

Figure 9:
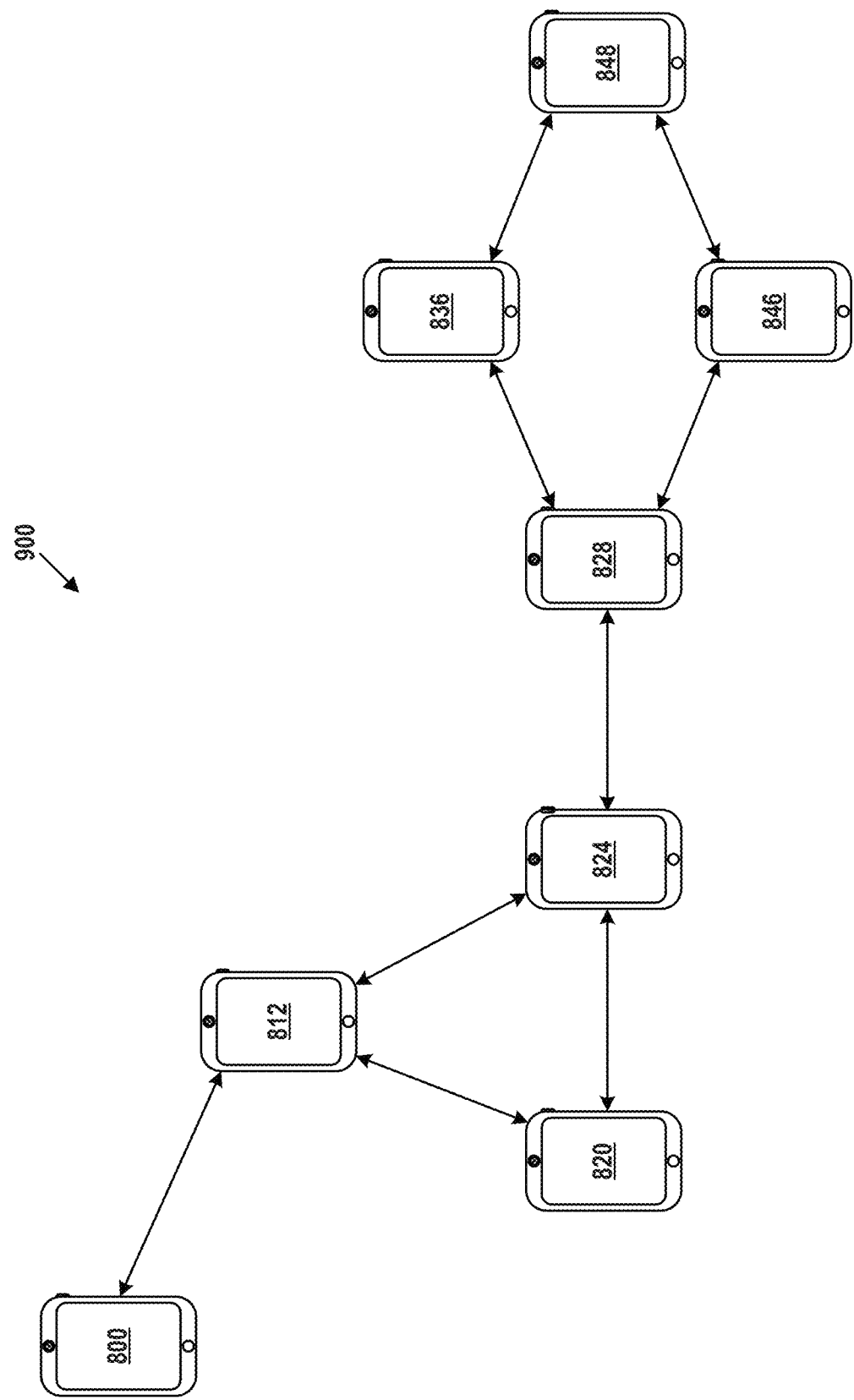
FIG. 9 displays navigation between graphical user interfaces, in accordance with example embodiments.

FIG. 9 is an overview 900 of how the native mobile application may facilitate navigation between the GUIs described above. Nonetheless, this is just one possible example of such navigation, and other orderings of GUIs may be possible. The navigation may begin at GUI 800, the list of purchase orders. From there, the user can select one such purchase order from the list and the native mobile application responsively displays GUI 812 containing detailed information about the selected purchase order. Alternatively, either GUI 820 or GUI 824 may be displayed.

From GUI 812, the user can navigate to GUI 820, displaying activity stream 822, or GUI 824, displaying related list 826 of purchase order line items. In particular, the user can navigate between GUI 812, GUI 820, and GUI 824, each of which displays different information about the selected purchase order.

From GUI 824, the user can navigate to GUI 828, displaying purchase order line items for the selected purchase order. Selecting or swiping one of these line items may cause the native mobile application to display GUI 836 (select) or GUI 846 (swipe), each facilitating receiving a purchase order line item. From either GUI 836 or GUI 846, the native mobile application may navigate to GUI 848, facilitating a user scanning a package containing goods associated with the purchase order line item.

Once the scanning takes place, e.g., by way of a camera, the native mobile application may navigate back to either GUI 836 or GUI 846, with the displayed GUI updated to reflect that the package was received.

Note that FIG. 9 provides just one possible sequencing of GUIs. Other sequencings, with different flows between various GUIs, are possible.

VII. Example Operations

Figure 10:
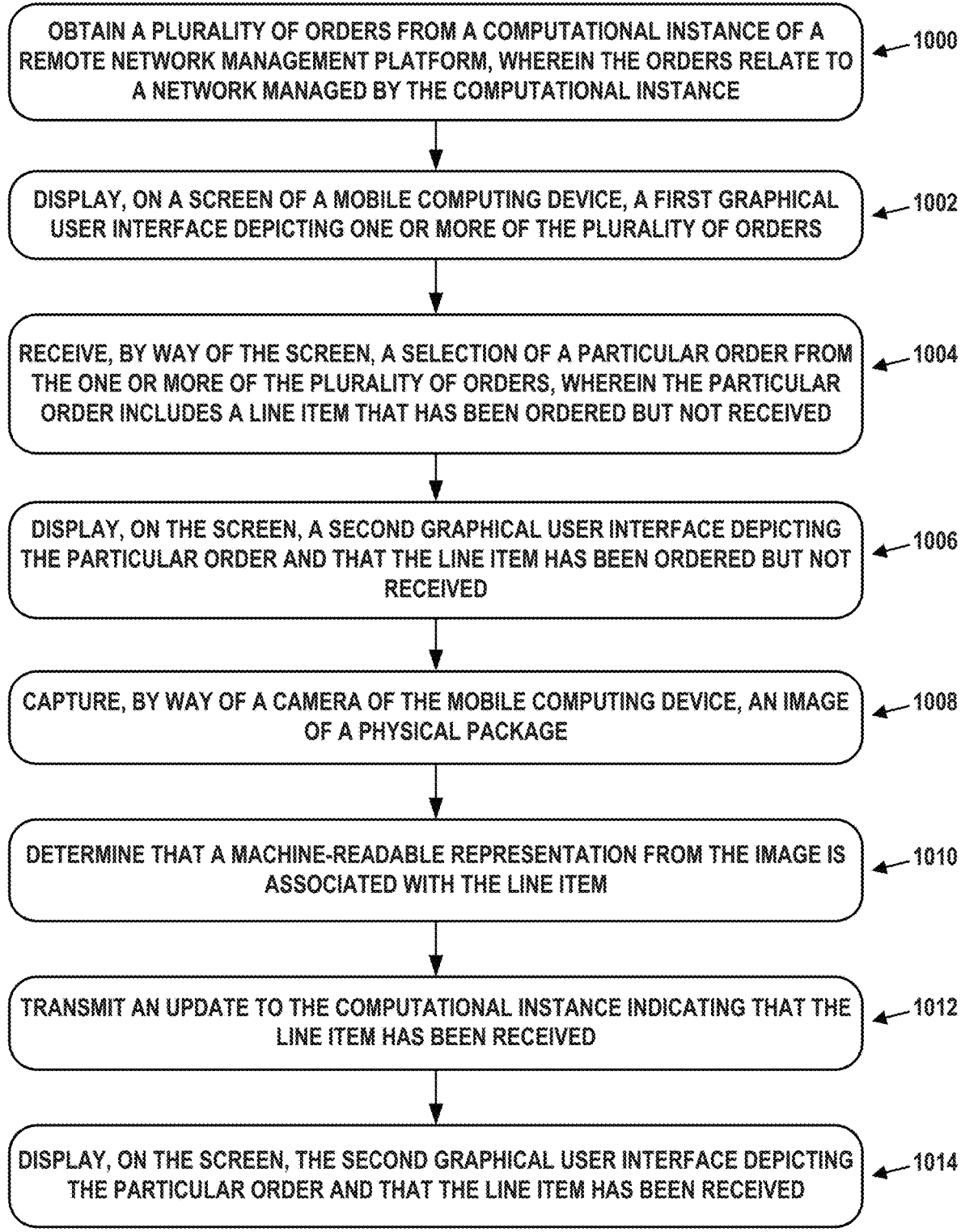
FIG. 10 is a flow chart, in accordance with example embodiments.

FIG. 10 is a flow chart illustrating an example embodiment. The process illustrated by FIG. 10 may be carried out by a mobile computing device, such as mobile computing device 600. However, the process can be carried out by other types of devices or device subsystems.

The embodiments of FIG. 10 may be simplified by the removal of any one or more of the features shown therein. Further, these embodiments may be combined with features, aspects, and/or implementations of any of the previous figures or otherwise described herein.

Block 1000 may involve obtaining, by a native mobile application, a plurality of orders from a computational instance of a remote network management platform, wherein the orders relate to a network managed by the computational instance.

Block 1002 may involve displaying, on a screen of a mobile computing device executing the native mobile application, a first graphical user interface depicting one or more of the plurality of orders.

Block 1004 may involve receiving, by way of the screen, a selection of a particular order from the one or more of the plurality of orders, wherein the particular order includes a line item that has been ordered but not received.

Block 1006 may involve displaying, on the screen, a second graphical user interface depicting the particular order and that the line item has been ordered but not received.

Block 1008 may involve capturing, by way of a camera of the mobile computing device, an image of a physical package.

Block 1010 may involve determining, by the native mobile application, that a machine-readable representation from the image is associated with the line item.

Block 1012 may involve transmitting, by the native mobile application, an update to the computational instance indicating that the line item has been received.

Block 1014 may involve displaying, on the screen, the second graphical user interface depicting the particular order and that the line item has been received.

In some embodiments, the plurality of orders are stored in a first database of the computational instance, wherein the computational instance also contains a second database of configuration items, wherein the configuration items represent computer hardware and software disposed within the network, and wherein the update indicating that the line item has been received causes the computational instance to create a new configuration item in the second database, the new configuration item representing computer hardware or software contained within the physical package.

In some embodiments, the plurality of orders are stored in a first database of the computational instance, wherein the computational instance also contains a second database of configuration items, wherein the configuration items represent computer hardware and software disposed within the network, wherein the update indicating that the line item has been received updates the first database. These embodiments may further involve transmitting a second update to the second database, the second update representing computer hardware or software contained within the physical package, wherein reception of the second update causes the computational instance to create a new configuration item in the second database, the new configuration item representing the computer hardware or software contained within the physical package.

In some embodiments, the first graphical user interface depicting one or more of the plurality of orders comprises the first graphical user interface displaying a partial list of the plurality of orders, each entry in the partial list indicating an order number, vendor, expected time of delivery, and delivery location, and wherein a number of orders in the partial list and a displayed size of each of the orders is adapted to be readable on the screen.

Some embodiments may further involve, after displaying the second graphical user interface and before capturing the image of the physical package: (i) receiving, by way of the screen, a further selection of the line item, and (ii) displaying, on the screen, a third graphical user interface depicting the line item, wherein the third graphical user interface contains a selectable menu option to activate the camera for capturing the image.

Some embodiments may further involve, after displaying the second graphical user interface and before capturing the image of the physical package, displaying, on the screen, a third graphical user interface depicting the line item amongst one or more line items of the particular order, wherein the depiction of the line item on the third graphical user interface can be swiped, by way of the screen, to activate the camera for capturing the image.

In some embodiments, the machine-readable representation from the image visibly appears on the physical package, and wherein determining that the machine-readable representation in the image is associated with the line item comprises: performing text recognition on the image to determine a textual reference string in the machine-readable representation; and confirming that the textual reference string is listed in the line item. In some embodiments, the textual reference string is an order number or a serial number.

In some embodiments, the second graphical user interface depicting the particular order is navigable to a third graphical user interface depicting a temporal activity stream associated with the particular order, wherein the temporal activity stream identifies shipment time of the particular order if applicable and reception time of the particular order if applicable, and wherein the native mobile application allows attachment of images captured by the camera to the temporal activity stream.

In some embodiments, the machine-readable representation is a bar code, QR code, or asset tag.

VIII. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A mobile computing device comprising:
a camera;
a communication interface;
a processor; and
memory containing program instructions that cause the processor to execute a native mobile application, wherein the native mobile application is configured to:
receive, by way of the communication interface, a plurality of orders from a computational instance of a remote network management platform, wherein the plurality of orders relate to a network managed by the computational instance;
display a first graphical user interface comprising respective representations of one or more orders of the plurality of orders;
receive a selection of a respective representation of a particular order from the respective representations of the one or more orders, wherein the particular order includes a line item that has been ordered but not received;
display a second graphical user interface comprising the respective representation of the particular order and an indication that the line item has been ordered but not received;
receive a selection of a representation of the line item;
display a third graphical user interface comprising the representation of the line item and a selectable menu option configured to activate the camera to capture an image of a physical package;
receive a selection of the selectable menu option;
capture, by way of the camera, the image of the physical package;
determine that a machine-readable representation from the image is associated with the line item;
transmit, by way of the communication interface, an update to the computational instance indicating that the line item has been received; and
display the second graphical user interface comprising the respective representation of the particular order and an indication that the line item has been received.

2. The mobile computing device of claim 1, wherein the plurality of orders are stored in a first database of at least two databases associated with the computational instance, wherein a second database of the at least two databases is configured to store one or more configuration items that represent computer hardware and software disposed within the network, and wherein the update indicating that the line item has been received causes the computational instance to create a new configuration item configured to be stored in the second database, the new configuration item representing additional computer hardware or software contained within the physical package.

3. The mobile computing device of claim 1, wherein the plurality of orders are stored in a first database of at least two databases associated with the computational instance, wherein a second database of the at least two databases is configured to store one or more configuration items that represent computer hardware and software disposed within the network, wherein the update indicating that the line item has been received is configured to update the first database, and wherein the native mobile application is configured to:

transmit, by way of the communication interface, a second update to the second database, wherein reception of the second update causes the computational instance to create a new configuration item configured to be stored in the second database, the new configuration item representing additional computer hardware or software contained within the physical package.

4. The mobile computing device of claim 1, wherein the first graphical user interface comprises a partial list of the plurality of orders, each entry in the partial list comprising respective indications of an order number, vendor, expected time of delivery, and delivery location, and wherein a number of the plurality of orders in the partial list and a respective displayed size of each order of the number of the plurality of orders is configured to be adaptable to be readable on the mobile computing device.

5. The mobile computing device of claim 1, wherein the machine-readable representation from the image visibly appears on the physical package, and wherein determining that the machine-readable representation in the image is associated with the line item comprises:

performing text recognition on the image to determine a textual reference string in the machine-readable representation; and confirming that the textual reference string is listed in the line item.

6. The mobile computing device of claim 5, wherein the textual reference string is an order number or a serial number.

7. The mobile computing device of claim 1, wherein the second graphical user interface comprising the respective representation of the particular order is navigable to a third graphical user interface comprising a representation of a temporal activity stream associated with the particular order, wherein the representation of the temporal activity stream identifies a shipment time of the particular order if applicable and a reception time of the particular order if applicable, and wherein the native mobile application allows attachment of one or more images captured by the camera to the temporal activity stream.

8. The mobile computing device of claim 1, wherein the machine-readable representation is a bar code, a QR code, or an asset tag.

9. A computer-implemented method comprising:

receiving, by a native mobile application, a plurality of orders from a computational instance of a remote network management platform, wherein the plurality of orders relate to a network managed by the computational instance;

displaying, by a mobile computing device executing the native mobile application, a first graphical user interface comprising respective representations of one or more orders of the plurality of orders;

receiving, by the mobile computing device, a selection of a respective representation of a particular order from the respective representations of the one or more orders, wherein the particular order includes a line item that has been ordered but not received;

displaying, by the mobile computing device, a second graphical user interface comprising the respective representation of the particular order and an indication that the line item has been ordered but not received;

receiving, by the mobile computing device, a selection of a representation of the line item;

displaying, by the mobile computing device, a third graphical user interface comprising the representation of the line item, wherein a user input is configured to interact with the representation of the line item to activate a camera of the mobile computing device;

receiving, by the mobile computing device, the user input to activate the camera;

capturing, by way of the camera of the mobile computing device, an image of a physical package;

determining, by the native mobile application, that a machine-readable representation from the image is associated with the line item;

transmitting, by the native mobile application, an update to the computational instance indicating that the line item has been received; and displaying, by the mobile computing device, the second graphical user interface comprising the respective representation of the particular order and an indication that the line item has been received.

10. The computer-implemented method of claim 9, wherein the plurality of orders are stored in a first database of at least two databases associated with the computational instance, wherein a second database of the at least two databases is configured to store one or more configuration items that represent computer hardware and software disposed within the network, and wherein the update indicating that the line item has been received causes the computational instance to create a new configuration item configured to be stored in the second database, the new configuration item representing additional computer hardware or software contained within the physical package.

11. The computer-implemented method of claim 9, wherein the plurality of orders are stored in a first database of at least two databases associated with the computational instance, wherein a second database of the at least two databases is configured to store one or more configuration items that represent computer hardware and software disposed within the network, wherein the update indicating that the line item has been received is configured to update the first database, and wherein the computer-implemented method comprises:

transmitting a second update to the second database, wherein reception of the second update causes the computational instance to create a new configuration item configured to be stored in the second database, the new configuration item representing additional computer hardware or software contained within the physical package.

12. The computer-implemented method of claim 9, wherein the first graphical user interface comprises a partial list of the plurality of orders, each entry in the partial list comprising respective indications of an order number, vendor, expected time of delivery, and delivery location, and wherein a number of the plurality of orders in the partial list and a respective displayed size of each order of the number of the plurality of orders is configured to be adaptable to be readable on the mobile computing device.

13. The computer-implemented method of claim 9, wherein the machine-readable representation from the image visibly appears on the physical package, and wherein determining that the machine-readable representation in the image is associated with the line item comprises:
performing text recognition on the image to determine a textual reference string in the machine-readable representation; and
confirming that the textual reference string is listed in the line item.

14. The computer-implemented method of claim 13, wherein the textual reference string is an order number or a serial number.

15. The computer-implemented method of claim 9, wherein the second graphical user interface comprising the respective representation of the particular order is navigable to a third graphical user interface comprising a representation of a temporal activity stream associated with the particular order, wherein the representation of the temporal activity stream identifies a shipment time of the particular order if applicable and a reception time of the particular order if applicable, and wherein the native mobile application allows attachment of one or more images captured by the camera to the temporal activity stream.

16. An article of manufacture including a non-transitory computer-readable medium, having stored thereon program instructions that, upon execution by a mobile computing device, cause a native mobile application of the mobile computing device to perform operations comprising:

receive a plurality of orders from a computational instance of a remote network management platform, wherein the plurality of orders relate to a network managed by the computational instance;
display, via the mobile computing device, a first graphical user interface comprising respective representations of one or more orders of the plurality of orders;
receive a selection of a respective representation of a particular order from the respective representations of the one or more orders, wherein the particular order includes a line item that has been ordered but not received;
display, via the mobile computing device, a second graphical user interface comprising the respective representation of the particular order and an indication that the line item has been ordered but not received;
receive a selection of a representation of the line item;
display, via the mobile computing device, a third graphical user interface comprising the representation of the line item and a selectable menu option configured to activate a camera of the mobile computing device to capture an image of a physical package;
receive a selection of the selectable menu option;
capture, by way of the camera of the mobile computing device, the image of the physical package;
determine that a machine-readable representation from the image is associated with the line item;
transmit an update to the computational instance indicating that the line item has been received; and
display, via the mobile computing device, the second graphical user interface comprising the respective representation of the particular order and an indication that the line item has been received.

* * * * *